United States Patent
Nilakantan et al.

(10) Patent No.: US 9,450,813 B2
(45) Date of Patent: *Sep. 20, 2016

(54) AUTOMATED HOST DEVICE VIRTUAL NETWORK CONFIGURATION SYSTEM

(71) Applicant: Dell Products L.P., Round Rock, TX (US)

(72) Inventors: Chandrasekharan Nilakantan, Cupertino, CA (US); Gary Lewis, San Jose, CA (US); Lawrence Stein, San Carlos, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/665,025

(22) Filed: Mar. 23, 2015

(65) Prior Publication Data

US 2015/0195129 A1    Jul. 9, 2015

Related U.S. Application Data

(63) Continuation of application No. 13/096,460, filed on Apr. 28, 2011, now Pat. No. 8,990,824.

(51) Int. Cl.
*G06F 9/46* (2006.01)
*H04L 12/24* (2006.01)
*G06F 9/455* (2006.01)

(52) U.S. Cl.
CPC ........ *H04L 41/0803* (2013.01); *G06F 9/45558* (2013.01); *H04L 41/0886* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 7,724,670 B2 | 5/2010 | Nilakantan et al. | |
| 8,472,443 B2 | 6/2013 | Enduri et al. | |
| 8,612,738 B2 | 12/2013 | Nilakantan et al. | |
| 2002/0101873 A1 | 8/2002 | Perlman et al. | |
| 2004/0210623 A1 | 10/2004 | Hydrie et al. | |
| 2006/0230219 A1* | 10/2006 | Njoku | G06F 13/4022 710/316 |
| 2007/0027973 A1* | 2/2007 | Stein | H04L 41/0869 709/223 |
| 2007/0174410 A1 | 7/2007 | Croft et al. | |
| 2007/0268917 A1 | 11/2007 | Wong et al. | |
| 2008/0091929 A1 | 4/2008 | Oberhaus et al. | |
| 2008/0219253 A1 | 9/2008 | Pozhenko et al. | |
| 2011/0022694 A1 | 1/2011 | Dalal et al. | |
| 2012/0278802 A1 | 11/2012 | Nilakantan et al. | |

* cited by examiner

*Primary Examiner* — Wissam Rashid
(74) *Attorney, Agent, or Firm* — Haynes and Boone, LLP

(57) ABSTRACT

A method of automatically configuring a data network, the data network including a controller and a virtualization host with a hypervisor installed thereon, the method including creating a virtual switch in the hypervisor and communicatively coupling the virtual switch to a first physical network interface in the virtualization host. Further, the method includes receiving a request to boot an operating system image in a virtual machine in the hypervisor, the operating system image having network connectivity requirements. The method also includes creating a first virtual port in the virtual switch based upon the network connectivity requirements of the operating system image and creating a first virtual network adapter in the virtual machine in the hypervisor. Further, the method includes communicatively coupling the first virtual network adapter to the first virtual port in the virtual switch and configuring networking attributes of the first virtual network adapter in the virtual machine.

20 Claims, 7 Drawing Sheets

AUTOMATED HOST DEVICE VIRTUAL NETWORK CONFIGURATION SYSTEM

CROSS REFERENCE TO RELATED APPLICATIONS

The present application is a Continuation Application of U.S. Utility application Ser. No. 13/096,460, filed on Apr. 28, 2011, which is related to U.S. Utility application Ser. No. 13/096,061, filed on Apr. 28, 2011, now patented, U.S. Pat. No. 8,612,738, issued on Dec. 17, 2013 the disclosures which are incorporated herein by reference.

BACKGROUND

The present disclosure relates generally to data networks, and more particularly to configuring network communications of a virtualization host in a data network.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs are often networked together in large data centers. Data center management software has been developed to automate common data center tasks and to remotely manage hosts in the data center. As an aspect of this, the management software may often centrally store a variety of operating systems images that may be distributed to any number of the hosts in the network. In some data centers, these operating system images may be booted on either bare metal servers or virtual machines running on virtualization hosts. Traditionally, after an operating system has been distributed and booted in a virtual machine, a data center administrator may be required to configure the networking resources of the virtualization host and the virtual machine before the operating system within it can communicate with other hosts in the network. Accordingly, it would be desirable to provide an improved system and method for automated network configuration of virtualization hosts and virtual machines in data networks.

SUMMARY

In one exemplary aspect, the present disclosure is directed to a method of automatically configuring a data network, the data network including a controller and a virtualization host with a hypervisor installed thereon, the method comprising automatically creating, with the controller, a virtual switch in the hypervisor based upon network connectivity of a first physical network interface in the host, communicatively coupling, with the controller, the virtual switch to the first physical network interface in the virtualization host, receiving a request, at the controller, to boot an operating system image in a virtual machine in the hypervisor, the operating system image having network connectivity requirements, creating, with the controller, a first virtual port in the virtual switch based upon the network connectivity requirements of the operating system image, creating, with the controller, a first virtual network adapter in the virtual machine in the hypervisor, communicatively coupling, with the controller, the first virtual network adapter to the first virtual port in the virtual switch, and configuring, with the controller, networking attributes of the first virtual network adapter in the virtual machine based upon the network connectivity requirements of the operating system image.

In another exemplary aspect, the present disclosure is directed to a method of configuring a data network, the data network including a controller, a virtualization host with a hypervisor installed thereon and, a plurality of virtual networks associated with portions of the data network, the method comprising determining, with the controller, which virtual networks in the plurality of virtual networks each physical network interface in the virtualization host provides access to, the determining including forming a first set of physical network interfaces, wherein each physical network interface in the first set of physical network interfaces provides access to the same virtual networks, automatically creating, with the controller, a first virtual switch in the hypervisor, the first virtual switch corresponding to the first set of physical network interfaces, communicatively coupling, with the controller, the first virtual switch to each of the physical network interfaces in the first set of physical network interfaces, receiving a request, at the controller, to boot an operating system image in a virtual machine in the hypervisor, the operating system image requiring network connectivity to a first virtual network in the plurality of virtual networks, creating, with the controller, a first virtual port in the first virtual switch based upon the required connectivity of the operating system image to the first virtual network, creating, with the controller, a first virtual network adapter in the virtual machine in the hypervisor, the first virtual network adapter corresponding to the first virtual port, communicatively coupling, with the controller, the first virtual network adapter to the first virtual port in the first virtual switch, and configuring, with the controller, networking attributes of the first virtual network adapter in the virtual machine based upon the network connectivity requirements of the operating system image.

In yet another exemplary aspect, the present disclosure is directed to A data network management system for managing a data network that includes a virtualization host with a hypervisor installed thereon and includes a plurality of virtual networks associated with portions of the data network, the system comprising a controller operable to: determine which virtual networks in the plurality of virtual networks each physical network interface in the virtualization host provides access to and form a first set of physical network interfaces, wherein each physical network interface in the first set of physical network interfaces provides access to the same virtual networks, automatically create a first virtual switch in the hypervisor, the first virtual switch corresponding to the first set of physical network interfaces, communicatively couple the first virtual switch to each of the physical network interfaces in the first set of physical network interfaces, receive a request to boot an operating system image in a virtual machine in the hypervisor, the operating system image requiring network connectivity to a first virtual network in the plurality of virtual networks, create a first virtual port in the first virtual switch based upon the required connectivity of the operating system image to the first virtual network, create a first virtual network adapter in the virtual machine in the hypervisor, the first virtual network adapter corresponding to the first virtual port, communicatively couple the first virtual network adapter to the first virtual port in the first virtual switch, and configure networking attributes of the first virtual network adapter in the virtual machine based upon the network connectivity requirements of the operating system image.

DETAILED DESCRIPTION

Figure 1:
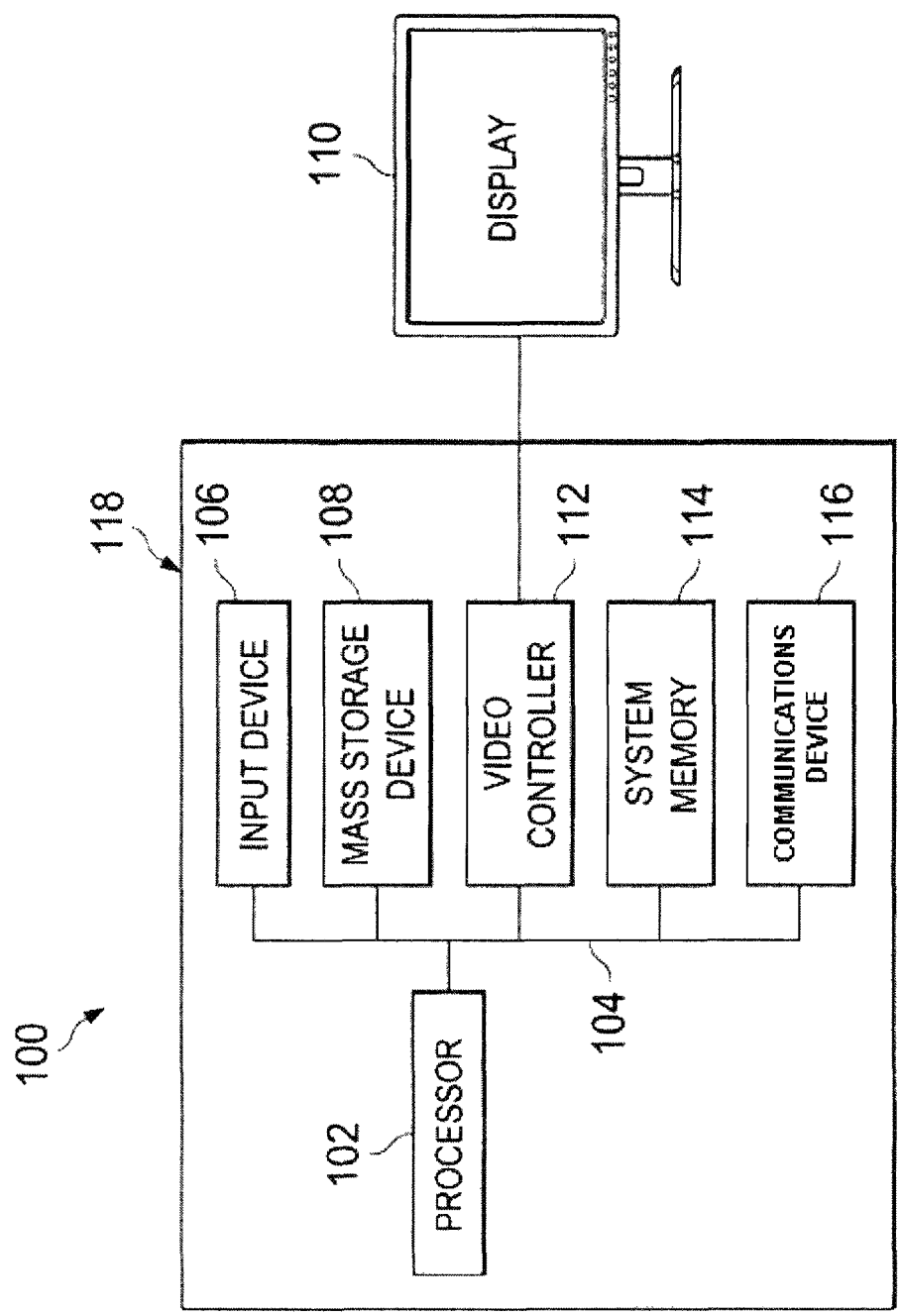
FIG. 1 is a functional block diagram of an exemplary embodiment of an information handling system (IHS).

FIG. 1 is a functional block diagram of an exemplary embodiment of an information handling system (IHS) 100. The IHS 100 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the IHS 100 may be a personal computer, workstation, server, blade in a blade server, a PDA, a consumer electronic device, such as a smartphone, or any other suitable device and may vary in size, shape, performance, functionality, and price.

In one embodiment, the IHS 100, includes a processor 102, which is coupled to a bus 104. Bus 104 serves as a connection between processor 102 and other components of IHS 100. An input device 106 is coupled to processor 102 to provide input to processor 102. Examples of input devices may include keyboards, touchscreens, pointing devices such as mice, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, the IHS 100 includes a non-transitory computer-readable medium (e.g., the storage 108, the memory 114, etc) that may include computer-readable instructions that, when executed, cause the processor 102 to perform a variety of functions, described in further detail below. A communications device 116, such as a network interface card (NIC), is coupled to processor 102 to allow the IHS 100 to communicate with other devices over a network. In an embodiment, a chassis 118 houses some or all of the components of IHS 100. It should be understood that other buses and intermediate circuits can be deployed between the components described above and processor 102 to facilitate interconnection between the components and the processor 102.

Figure 2:
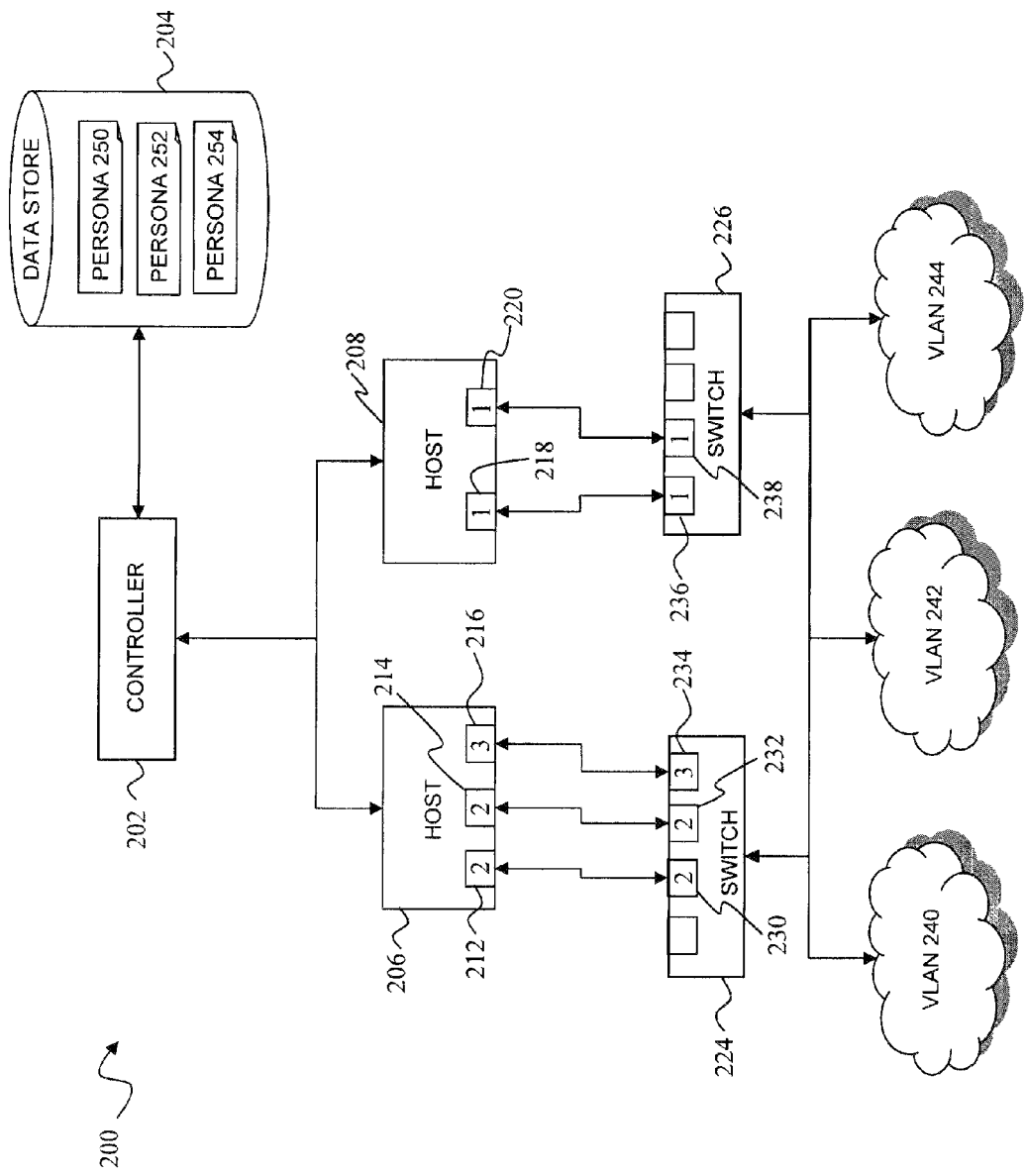
FIG. 2 is a functional block diagram of an exemplary embodiment of a managed system.

FIG. 2 is a functional block diagram of an exemplary embodiment of a managed system 200. The managed system 200 includes a controller 202 to centrally manage a multitude of heterogeneous servers, storage devices and networks in the system. In one embodiment, the controller 202 is an information handling system similar to IHS 100 with software configured to manage and monitor the managed system 200. In general, the controller 202 is operable to automatically distribute workloads and applications between hosts in the managed system 200 in response to user demand. More specifically, rather than a network administrator having to manually install an operating system (OS) image and applications on each host in the system, the controller 202 is configured to choose an appropriate host for a workload and automatically install or boot and configure an OS image and applications on the host. This is accomplished by logically separating the host software from the host hardware. In this regard, the controller 202 manages a plurality of software images, called personas, that include, among other things, an OS image, applications installed in the OS, and configuration metadata such as network configuration attributes. In some instances, personas may be simply referred to as operating system images even though they may contain an OS image, applications, configuration metadata, etc. These personas (or operating system images) may be booted on any suitable host in the system 200. The managed system 200 includes a data store 204 to store and replicate these personas. In the illustrated embodiment, the data store 202 is a central storage repository such as a Fibre Channel storage area network (SAN), iSCSI target, or network-attached storage (NAS). However, in other embodiments, the data store 204 may be integrated into the controller 202. Additionally, the controller 202 stores and continually updates an inventory of all managed hosts in the managed system 200. The inventory includes bare metal hosts configured to boot operating system images directly on host hardware (i.e. in a "bare metal" configuration) and also includes virtualization hosts configured to boot one or more operating system images in a virtual machine. When the controller 202 receives a request to boot a specific persona, the controller is operable to automatically select a bare metal host or a virtual machine on a virtualization host in which to boot the persona. The controller 202 selects a host in part on the network connectivity requirements of the persona. In some embodiments, a user may impose additional selection criteria to which the selected host must conform. The selection of a host by the controller 202 will be discussed in greater detail below. Further, after a bare metal host or virtual machine has been selected for a persona, the controller 202 is operable to boot the persona on the host or virtual machine and automatically configure the host according to the requirements of the persona. As one aspect of this, the controller 202 is operable to automatically configure virtual switches on a virtualization host to fulfill the persona's network connectivity requirements without intervention from a network administrator. The configuration of virtual switches by the controller 202 will be discussed in greater detail in association with FIGS. 3-7.

The managed system 200 further includes hosts 206 and 208 that, in the current embodiment, are information handling systems similar to IHS 100 and may be servers, workstations, blade servers, or another type of IHS. In the illustrated embodiment, the hosts 206 and 208 are virtualization hosts in that they include virtualization software (i.e. a hypervisor) such as VMWare ESX, Microsoft Hyper-V, and Xen. The hosts 206 and 208 are communicatively coupled to the controller 202 via a dedicated system control network through which the controller may issue commands, monitor, and deploy personas to the hosts. As one aspect of this, the hosts may each include a management controller such as a baseboard management controller (BMC), an integrated Dell remote access controller (iDRAC), or other out-of-band (OOB) controller. Further, each host 206 and 208 includes one or more physical network interfaces to communicate with other devices in the managed system 200. For instance, in the illustrated embodiment, the host 206 includes three 1 GB Ethernet network interface cards (NICs) 212, 214, and 216 and host 208 includes two 1 GB Ethernet NICs 218 and 220. These NICs may be LAN-on-Motherboard (LOM) NICs, PCI-based NICs, mezzanine NICs, or another suitable type of NIC.

The managed system 200 also includes a layer 2 interconnect fabric including Ethernet switches 224 and 226 that are communicatively coupled to the hosts 206 and 208. The switch 224 includes ports 230, 232, and 234 that are respectively coupled to NICs 212, 214, 216 on host 206. Switch 226 includes ports 236 and 238 that are respectively coupled to NICs 218 and 220 on host 208. As shown in FIG. 2, the switches 224 and 226 communicatively couple the hosts 206 and 208 to a plurality of virtual local area networks (VLANs) including VLAN 240, VLAN 242, and VLAN 244. For the sake of clarity, the network connections between the hosts 206 and 208, switches 212 and 214, and VLANs 240, 242, and 244 shown in FIG. 2 have been simplified. For example, the managed system 200 may include any number of additional networking devices including hubs, switches, routers, load balancers, firewalls, servers, virtual networks, subnets, SANs, and other networking devices known in the art.

In the managed system 200, to provide for automated network configuration, access to VLANs is abstracted into channels. In the illustrated embodiment, channels define the allowed connectivity of a network interface to specific VLANs. Or, in other words, a channel defines a network path through which only packets associated with specific VLANs may flow. Typically, a channel is associated with more than one VLAN. For example, in the managed system 200, each switch port 230, 232, 234, 236, and 238 is assigned a channel number. Accordingly, each switch port may only route packets to the VLANs associated with its assigned channel. Further, the NICs in hosts 206 and 208 inherit the channel of the switch port to which they are connected. For instance, because switch port 230 is assigned channel 2, as shown in FIG. 2, NIC 212 is also assigned channel 2. Additionally, VLAN connectivity overlaps between channels—that is, a particular VLAN may be accessed thorough more than one channel. As such, access to a particular VLAN may be gained through a primary channel or a secondary channel, the latter of which provides a failover path.

As shown in FIG. 2, the switch ports of switches 224 and 236 are assigned channels as follows: port 230 is assigned channel 2, port 232 is assigned channel 2, port 234 is assigned channel 3, port 236 is assigned channel 1, and port 238 is assigned channel 1. As noted above, the NICs coupled to these ports inherit the channel of the port. The VLAN connectivity permitted by these channels is as follows:

| Channel | VLAN |
|---------|----------|
| 1 | 240, 242 |
| 2 | 242, 244 |
| 3 | 244, 240 |

Thus, as an example, a network interface assigned channel 1, such as NIC 218 in host 208, may transmit and receive packets only from VLANs 240 and 242. Note that the above channel to VLAN associations are simply examples and, in other embodiments, the managed network 200 may include additional and/or different channels and additional and/or different VLANs, and the associated mappings may be somewhat more complex.

Still referring to FIG. 2, the data store 204 includes personas 250, 252, and 254 that the controller 202 may boot on any suitable bare metal host or virtual machine in the managed system 200. As mentioned above, the personas contain configuration metadata including a number of attributes that describe its network connectivity, storage, and application-specific configuration. For example, an application in a persona may require network connections to specific networks (i.e. VLANs) for testing purposes. Whether a host in the managed network 200 is suitable for a persona is dependent in part on whether it can fulfill the persona's network connectivity requirements. In this regard, the aforementioned channel concept is utilized by the controller 202 to match persona network connectivity requirements with host network connectivity capabilities. For instance, if the persona 250 requires a connection to VLAN 244, it must be booted on a host with a NIC assigned channel 2 or 3, since channel 1 does not provide a path to VLAN 244. Thus, host 208, which only has NICs that are assigned to channel 1, may not be selected by controller 202 as a boot host (either bare metal or virtual) for persona 250. However, the persona 250 may be booted on either directly one host 206 or in a virtual machine in host 206 because they provide access to VLAN 244. As another example, in the illustrated embodiment, the persona 252 requires network connectivity to VLANs 240, 242, and 244. The controller 202 may thus choose to boot persona 252 on a host with NICs assigned to any two of the three channels, as that would insure connectivity to all three VLANs. Thus, given the network connectivity requirements of persona 252, the controller 202 must choose to boot the persona 252 on host 206. As a further example, in the illustrated embodiment, the persona 254 requires network connectivity to VLANs 240 and 242. The controller 202 may select hosts 206 or 208 because channels 2 and 3 together provide access to VLANs 240 and 242, and channel 1 alone provides a path to VLANs 240 and 242. U.S. patent application Ser. No. 13/096,061 filed on Apr. 28, 2011, now patented U.S. Pat. No. 8,612,738, issued on Dec. 17, 2013, discloses further methods and systems for selecting a host in a managed network on which to boot a persona and is hereby incorporated by reference in its entirety.

Figure 3:
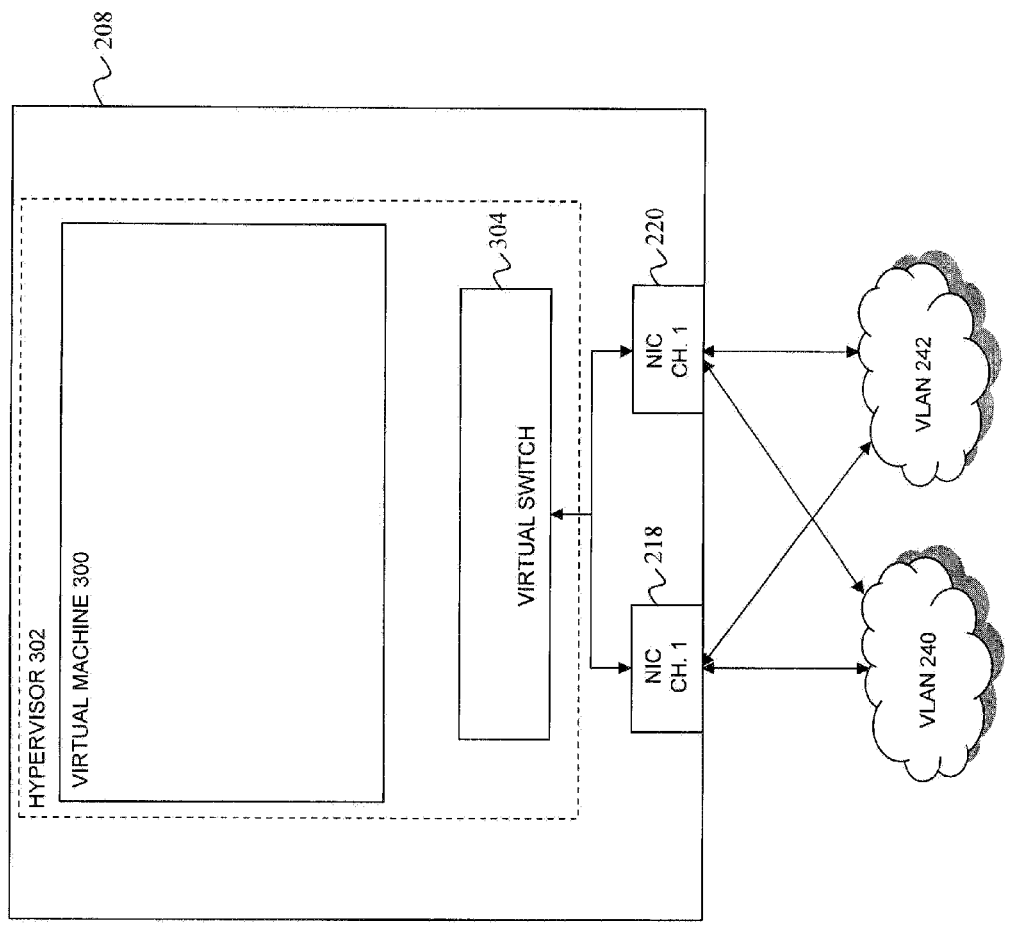
FIG. 3 is a functional block diagram of a portion of the managed system of FIG. 2 that includes a virtualization host.

With reference now to FIG. 3, illustrated is a functional block diagram of a portion of the managed system 200 that includes virtualization host 208. Specifically, FIG. 3 depicts virtualization host 208 in a state without a persona booted thereon. As shown, the physical NICs 218 and 220 each provide access to VLANS 240 and 244 because they are assigned channel 1. The virtualization host 208 includes a virtual machine 300 running in a hypervisor 302 that is ready for an operating system image. In some embodiments, the controller 202 may be operable to automatically create the virtual machine 300 based on a virtual machine template. As discussed above, a persona that requires access to VLANs 240, 244, or both may be booted in the virtual machine 300. The host 208 also includes a virtual switch 304 that is communicatively coupled to the NICs 218 and 220. Specifically, the NICs 218 and 220 are in a teamed configuration (i.e. aggregated) to provide for high availability and load balancing of network connections established by applications in the virtual machine 300.

In an exemplary embodiment, when the virtualization host 208 is powered on in the managed system 200, the controller 202 is operable to automatically prepare the host to receive a persona. Specifically, when the host 208 is added to the system 200, the controller will iterate over the physical NICs installed in the host—in this case NICs 218 and 220—and form a list of channels associated with the NICs. Then, for each discovered channel, the controller 202 will create a virtual switch in the host's hypervisor and link it to the physical NIC or NICs that are assigned that channel. Here, controller 202 discovered that NICs 218 and 220 are assigned channel 1 and thus created the virtual switch 304 in hypervisor 302. Because NICs 218 and 220 are both assigned channel 1, the controller 202 teamed them together via the virtual switch 304. Upon creation of one or more virtual switches in its hypervisor, a virtualization host is ready to receive and boot a persona in a virtual machine.

Figure 4:
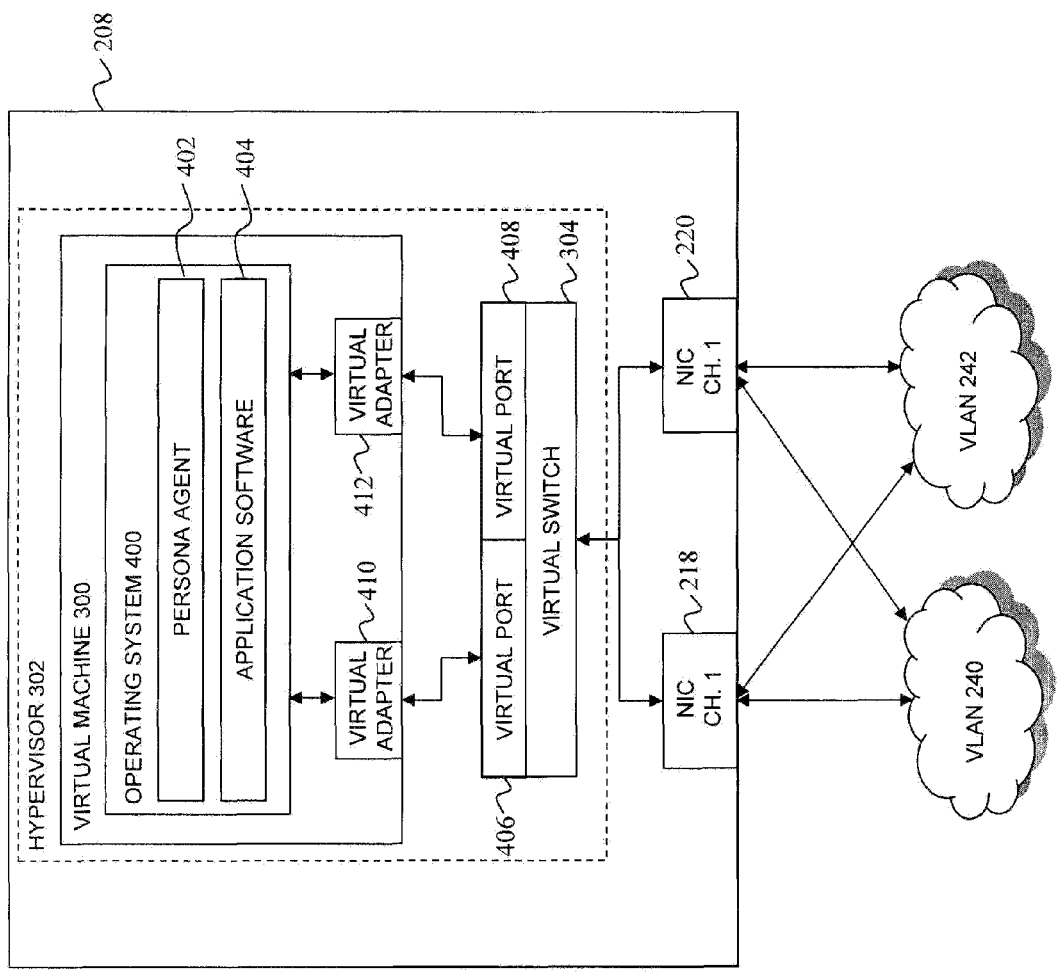
FIG. 4 is a functional block diagram of the portion of the managed system shown in FIG. 3 but depicting an operating system image booted on the virtualization host.

With reference now to FIG. 4, illustrated is a functional block diagram of a portion of the managed system 200 that includes host 208. Specifically, FIG. 4 depicts a scenario in which persona 254 has been booted on host 208. As discussed above, persona 254 requires network connectivity to VLANs 240 and 242. The controller 202 selected host 208 for persona 252 in part because its NICs 218 and 220 are assigned channel 1, which provides access to the required VLANs 240 and 242. As noted above, once host 208 has been selected for the persona 254, the controller 202 is operable to not only boot the persona on the host but also operable to automatically configure the host's virtualized networking configuration to fulfill the persona's network connectivity requirements. As shown in FIG. 4, when booted on host 208 the persona 254 includes at least an operating system 400, a persona agent 402, and application software 404. The persona agent 402 is a client program that communicates with controller 202 to receive instructions and configure aspects of the operating system 400. Specifically, the controller 202 utilizes the agent 402 to, among other things, configure the virtual network connections of the operating system 400 in the virtual machine 300. When the persona 254 is booted on the host 208 for the first time, the agent 402 is among the first programs to load in the operating system 400, as the agent is responsible for setting up the networking connections for other applications, such as application software 404. In the illustrated embodiment, the application software 404 is a web server that, for testing purposes, requires access to VLANs 240 and 242 (i.e. the reason persona 254 requires access to VLANs 240 and 242).

In order to configure the network connections of virtualization host 208, the controller 202 must perform a number of steps. First, the controller 202 must finish configuring the virtual switch 304 based on the specific network connectivity requirements of the persona 254. Specifically, the controller 202 will create host-facing virtual ports 406 and 408 in the virtual switch 304 based upon the identities of the VLANs to which the persona requires access, and based upon the channel assignments of the physical NICs to which the virtual switch 304 is linked. More to the point, each virtual port created by the controller 202 is associated with a VLAN to which the persona 254 requires access. Here, virtual port 406 is associated with VLAN 240 and virtual port 408 is associated VLAN 242. And, if, for example, the persona 254 only required access to VLAN 240 only one virtual port would be created in virtual switch 304. In some embodiments, the controller 202 may create port groups in the virtual switches to define the attributes of the virtual ports 406 and 408. Specifically, virtual port 406 may be a member of a port group in which every virtual port in the group shares the same attributes (e.g. VLAN ID). The controller may additionally configure common network attributes of port groups such as security attributes and traffic shaping attributes, etc. Additionally, multiple virtual adapters may connect to a single port group in a virtual switch. For instance, in those embodiments in which host 208 contains multiple virtual machines, virtual adapters in virtual machines other than virtual machine 300 may also connect to the same port group that contains virtual port 406, and consequently, those virtual adapters may also communicate with VLAN 240.

Further, the controller 202 will create virtual network adapters in the virtual machine 300 for each unique VLAN associated with the virtual ports 406 and 408. Notably, these virtual network adapters appear to the operating system 400 to be physical NICs, and the virtual switch configuration steps above are transparent to the operating system. In the illustrated embodiment, controller 202 created a virtual adapter 410 and connected it with virtual port 406 and created virtual adapter 412 and connected it with virtual port 408. In other embodiments, the virtual machine may already include virtual adapters. In such a case, the controller 202 may remove and recreate them or simply configure them to connect to the correct virtual port. Finally, the controller 202 will configure the layer 3 networking attributes of the virtual adapters 410 and 412. Specifically, the controller 202 will configure the following attributes for the virtual adapters 410 and 412: IP address, DHCP hostname, and NIC Specific Routes including multicasting. If the operating system 400 is a Windows-based operating system, the controller will additionally enable/disable NetBIOS over TCP, assign a Wins Server Address, and optionally register with a DNS server. After the virtual adapters 410 and 412 have been assigned layer 3 attributes, applications in operating system 400, such as application software 404, may access VLAN 240 through virtual adapter 410 and access VLAN 242 through virtual adapter 412.

Figure 5:
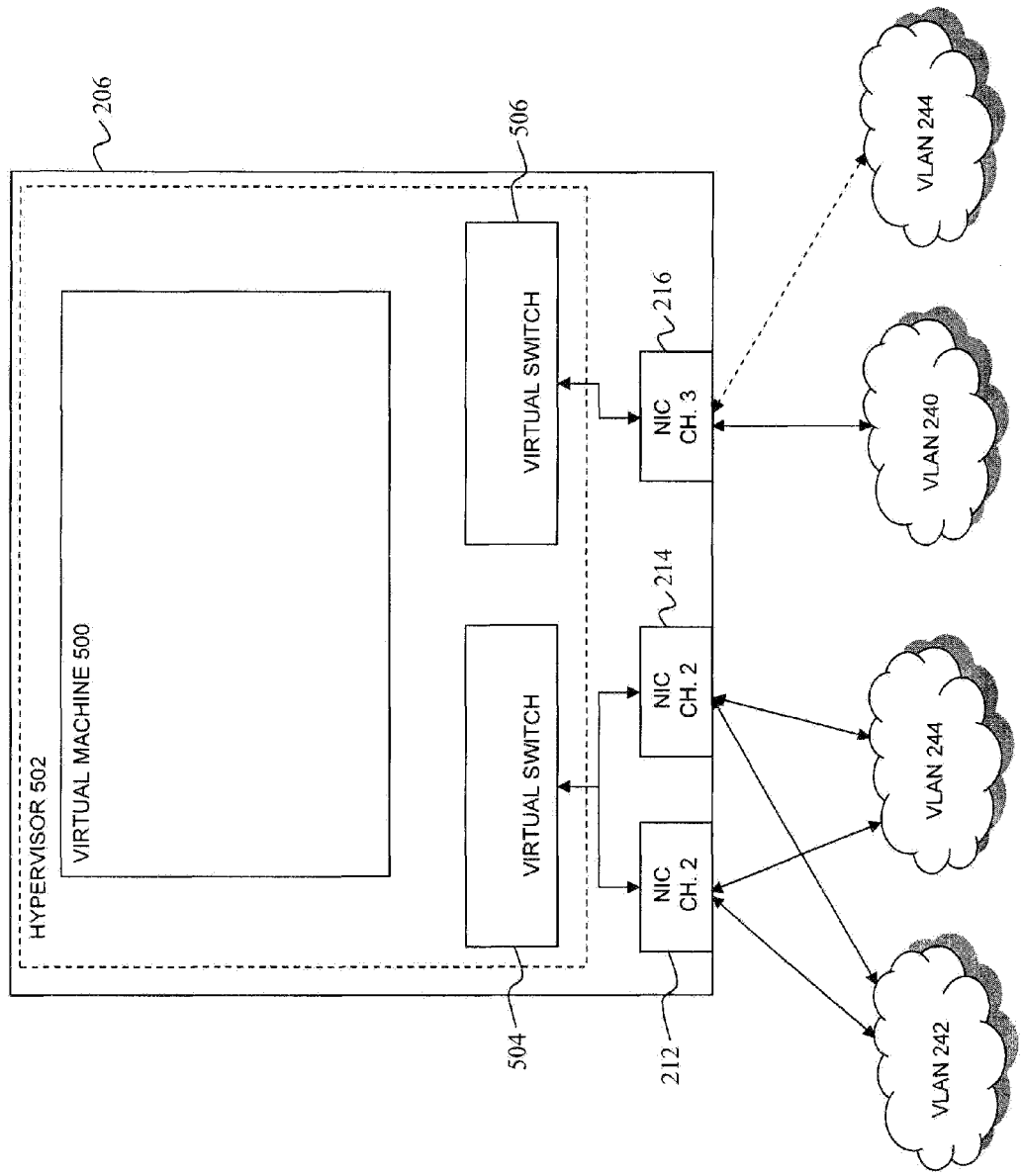
FIG. 5 is a functional block diagram of another portion of the managed system of FIG. 2 that includes a different virtualization host.

With reference now to FIG. 5, illustrated is a functional block diagram of a portion of the managed system 200 that includes virtualization host 206. Specifically, FIG. 5 depicts virtualization host 206 in a state without a persona booted thereon. As shown, the physical NICs 212 and 214 each provide access to VLANS 242 and 244 because they are assigned channel 2 and the physical NIC 216 provides access to VLANS 240 and 244 because it is assigned channel 3. The virtualization host 206 includes a virtual machine 500 running in a hypervisor 502 that is ready for an operating system image. As discussed above, a persona that requires access to VLANs 240, 242, 244, or all three may be booted in the virtual machine 500. The host 206 also includes a virtual switch 504 in hypervisor 502 that is communicatively coupled to the NICs 212 and 214 and a virtual switch 506 that is communicatively coupled to the NIC 216. In an exemplary embodiment, when the virtualization host was powered up in the managed system 200, the controller 202 iterated over the physical NICs 212, 214, and 216 and discovered associations to channel 2 and 3. Thus, the controller created two virtual switches, one for each channel. Specifically, the controller 202 created virtual switch 504 and coupled it via a teamed connection to NICs 212 and 214 and also created virtual switch 506 and coupled it to NIC 216.

Figure 6:
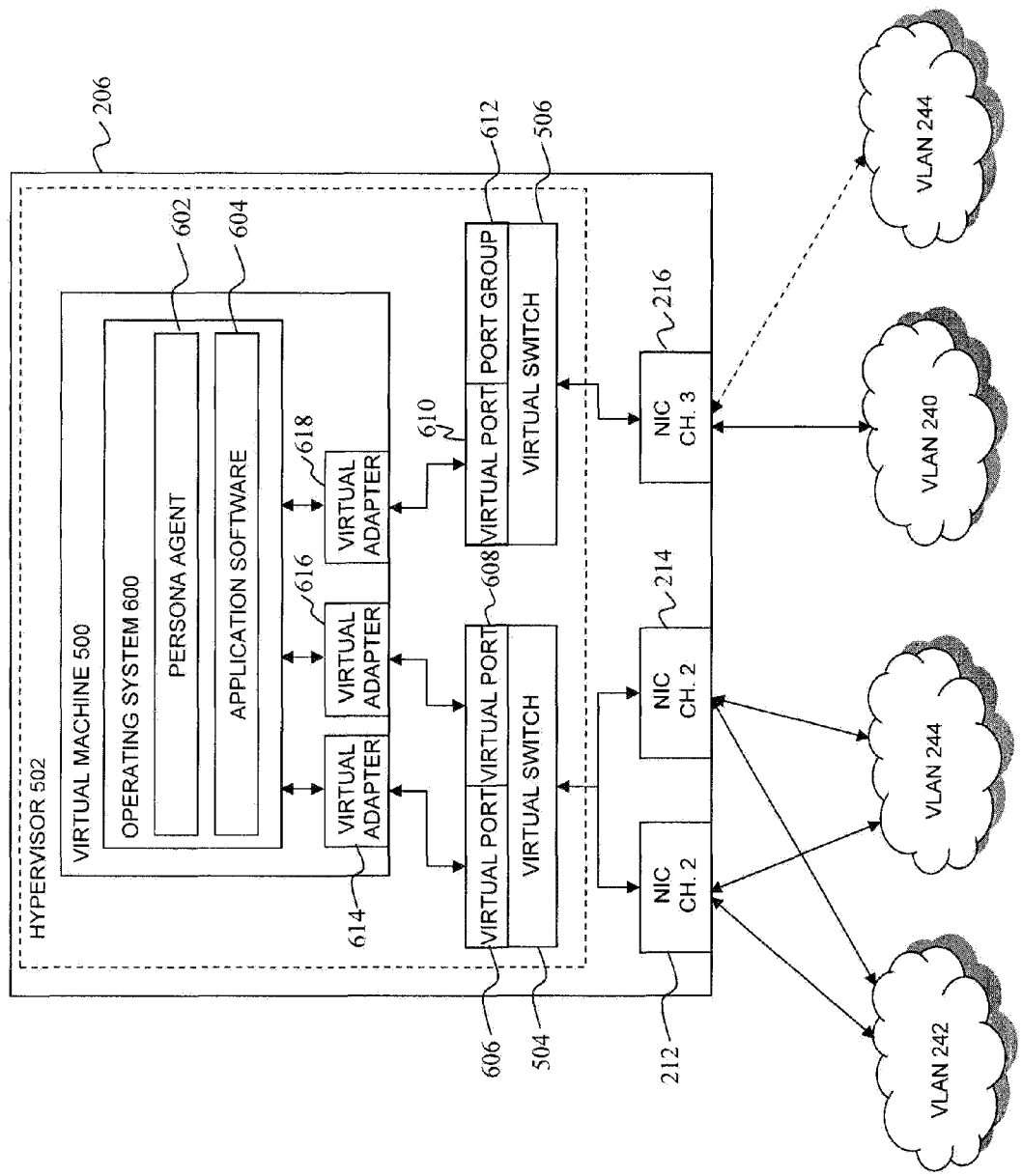
FIG. 6 is a functional block diagram of the portion of the managed system shown in FIG. 5 but depicting an operating system image booted on the different virtualization host.

With reference now to FIG. 6, illustrated is a functional block diagram of a portion of the managed system 200 that includes host 206. Specifically, FIG. 6 depicts a scenario in which persona 252 has been booted on host 206. As discussed above, persona 252 requires network connectivity to VLANs 240, 242, and 244. The controller 202 selected host 206 for persona 252 in part because its NICs 212, 214, and 216 are respectively assigned channels 2, 2, and 3, which together provide access to the required VLANs 240, 242, 244. As shown in FIG. 6, when booted on host 206 the persona 252 includes at least an operating system 600, a persona agent 602, and application software 604. In the illustrated embodiment, the application software 404 is a network traffic analyzer that, for testing purposes, requires access to VLANs 240, 242, and 244 (i.e. the reason persona 252 requires access to VLANs 240, 242, and 244).

In order to configure the network connections of virtualization host 206, the controller 202 must perform a number of steps. First, the controller 202 must finish configuring the virtual switches 504 and 506 based on the specific network connectivity requirements of the persona 252. Specifically, the controller 202 will create virtual ports 606 and 608 in the virtual switch 504 and associate virtual port 606 with VLAN 242 and associate virtual port 608 with VLAN 244. Additionally, the controller will create a virtual port 610 on the virtual switch 506 and associate it with VLAN 240. As mentioned above, the controller 202 may create port groups on the virtual switches to define the attributes of the virtual ports, where each port group is associated with a different VLAN. In some embodiments, even though the virtual port 608 on virtual switch 504 already provides access to VLAN 244, the controller 202 may still create a port group 612 on virtual switch 506 and associate it with VLAN 244 to provide a failover path to VLAN 244 (i.e. channel 2 is the primary channel for VLAN 244 and channel 3 is the secondary channel). In such a case, another virtual machine in host 206 may communicate with VLAN 244 via a virtual port in port group 612. Further, the controller 202 will create a virtual adapter in the virtual machine 500 for each unique VLAN associated with the virtual ports. Here, controller 202 will create a virtual adapter 614 and connect it to virtual port 606, create virtual adapter 616 and connect it to virtual port 608, and create virtual adapter 618 and connect it to virtual port 610. A virtual adapter will not be created for a virtual port in port group 612 because virtual port 608 already provides access to VLAN 244. Finally, the controller 202 will configure the layer 3 networking attributes (e.g. IP address) of the virtual adapters 614, 616, 618. After the virtual adapters 614, 616, 618 have been assigned layer 3 attributes, applications in operating system 600, such as application software 604, may access VLAN 242 through virtual adapter 614, access VLAN 244 through virtual adapter 616, and access VLAN 240 through virtual adapter 618.

Figure 7:
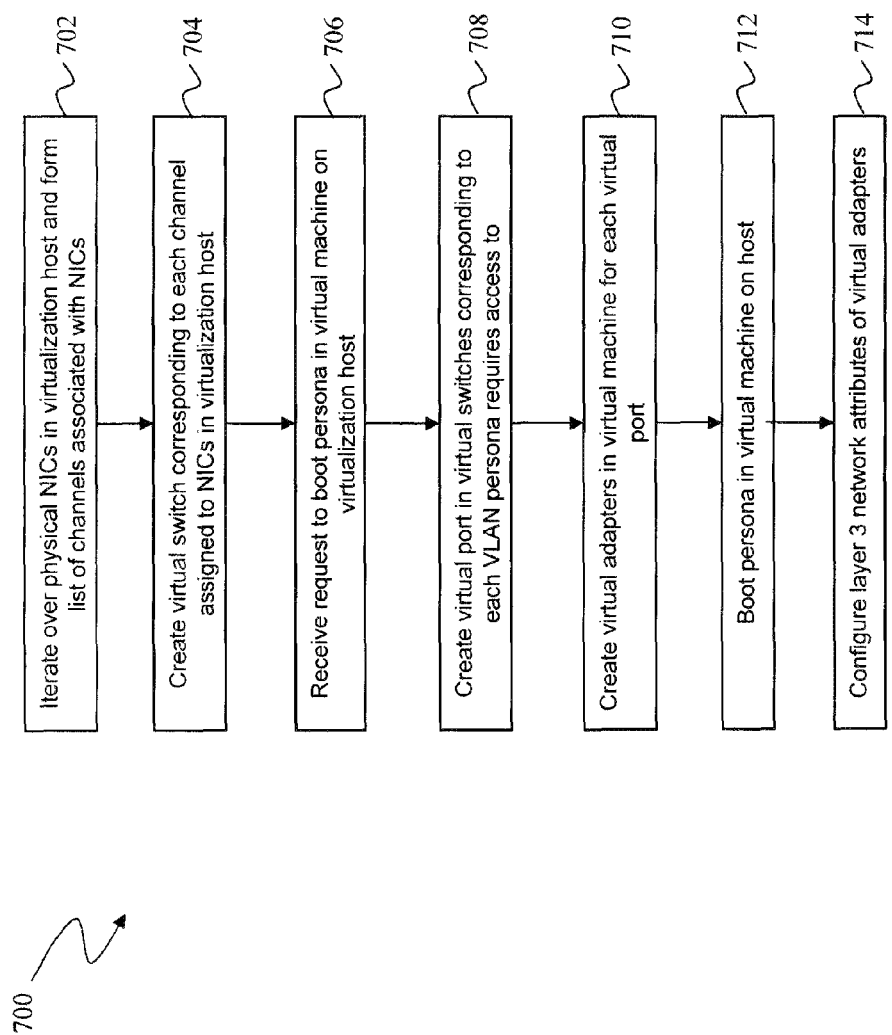
FIG. 7 is a high-level flowchart illustrating an exemplary embodiment of a method of configuring network connections on virtualization hosts in the managed system of FIG. 2.

FIG. 7 is a high-level flowchart illustrating an exemplary embodiment of a method 700 for configuring network connections on virtualization hosts in the managed system 200. Specifically, the controller 202 may utilize the method 700 to automatically (i.e. without administrator intervention) configure the virtual network connections of a hypervisor and virtual machine in which a persona will be booted. The method 700 begins at block 702 where the controller 202 iterates over the physical NICs in a virtualization host to form a list of channels associated with the NICs. The method 700 then proceeds to block 704 where the controller 202 creates a virtual switch in the host's hypervisor for each of the channels found to be assigned to NICs in the host. In some embodiments, the controller 202 will group the physical NICs into sets, where each NIC in a set is assigned to the same channel. In other words, if two or more NICs are assigned the same channel, only one virtual switch will be created for that channel and the NICs will be teamed together by the switch. Also, a set may include only one physical NIC if it is the only NIC assigned to a specific channel in the host (e.g. NIC 216 in host 206). Next, in block 706, the controller 706 receives a request to boot a persona in the virtual machine on the virtualization host. The controller 202 analyzes the required network connectivity of the persona (i.e. which VLANs it requires access to) and uses this information to dynamically complete the network setup of the virtualization host. The method 700 proceeds to block 708 where the controller creates virtual ports in the virtual switches corresponding to each VLAN to which the persona requires access. At this block, the controller 202 may also create port groups in the virtual switches to define the attributes of the virtual ports. Then, in block 710, the controller 202 creates a virtual adapter in the virtual machine corresponding to each virtual port and links them together. Next, in block 712, the controller 202 boots an operating system image contained in the persona in the virtual machine. The method 700 then proceeds to block 714 where the controller 202 configures the layer 3 network attributes (e.g. IP address) of the virtual adapters. In this manner, the host may access each of the VLANs to which it requires access through respective virtual adapters.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A virtualization configuration system, comprising:
  a host device that includes a first physical network interface and a virtual machine; and
  a controller that coupled to the host device through a network, wherein the controller is configured to:
    determine a connectivity provided by the first physical network interface to a plurality of virtual local area networks (VLANs);
    automatically create a virtual switch on the host device;
    couple the virtual switch to the first physical network interface;
    provide an application on the virtual machine, wherein the application requires connectivity to at least one of the plurality of VLANs;

create a virtual port in the virtual switch for each VLAN to which the application requires connectivity;
create a virtual network adapter in the virtual machine for each virtual port that was created;
couple each virtual network adapter to a respective virtual port; and
configure networking attributes of each virtual network adapter based upon the at least one VLAN to which the application requires connectivity.

2. The system of claim 1, wherein the host device includes a second physical network interface, and the controller is configured to:
determine that the second physical network interface includes the same connectivity as the first physical network interface to the plurality of VLANs and, in response, team the first physical network interface and the second physical network interface and communicatively couple the virtual switch, the first physical network interface and the second physical network interface.

3. The system of claim 1, wherein the configuring the networking attributes of each virtual network adapter includes configuring at least one of an Internet Protocol (IP) address, a Dynamic Host Configuration Protocol (DHCP) hostname, and a Network Interface Controller (NIC) specific route.

4. The system of claim 1, wherein the controller is configured to provide the application on the virtual machine in response to:
selecting the host device based on the connectivity provided by the first physical network interface to the plurality of VLANs.

5. The system of claim 1, wherein the controller is configured to:
provide an agent on the host device, wherein the networking attributes of each virtual network adapter are configured using the agent.

6. The system of claim 1, wherein the controller is configured to:
create a virtual port group in the virtual switch for at least one of the VLANs to which the application requires connectivity.

7. An information handling system (IHS), comprising:
a processing system;
a memory system that is coupled to the processing system and that includes instructions that, when executed by the processing system, cause the processing system to:
determine a connectivity provided by a first physical network interface on a host device to a plurality of virtual local area networks (VLANs);
automatically create a virtual switch on the host device;
couple the virtual switch to the first physical network interface;
provide an application on a virtual machine on the host device, wherein the application requires connectivity to at least one of the plurality of VLANs;
create a virtual port in the virtual switch for each VLAN to which the application requires connectivity;
create a virtual network adapter in the virtual machine for each virtual port that was created;
couple each virtual network adapter to a respective virtual port; and
configure networking attributes of each virtual network adapter based upon the at least one VLAN to which the application requires connectivity.

8. The IHS of claim 7, wherein the memory system includes instructions that, when executed by the processing system, cause the processing system to:
determine that a second physical network interface in the host device includes the same connectivity as the first physical network interface to the plurality of VLANs and, in response, team the first physical network interface and the second physical network interface and communicatively couple the virtual switch the first physical network interface and the second physical network interface.

9. The IHS of claim 7, wherein the configuring the networking attributes of each virtual network adapter includes configuring at least one of an Internet Protocol (IP) address, a Dynamic Host Configuration Protocol (DHCP) hostname, and a Network Interface Controller (NIC) specific route.

10. The IHS of claim 7, wherein the memory system includes instructions that, when executed by the processing system, cause the processing system to:
provide the application on the virtual machine in response to selecting the host device based on the connectivity provided by the first physical network interface to the plurality of VLANs.

11. The IHS of claim 7, wherein the memory system includes instructions that, when executed by the processing system, cause the processing system to:
provide an agent on the host device, wherein the networking attributes of each virtual network adapter are configured using the agent.

12. The IHS of claim 7, wherein the memory system includes instructions that, when executed by the processing system, cause the processing system to:
create a virtual port group in the virtual switch for at least one of the VLANs to which the application requires connectivity.

13. The IHS of claim 7, wherein the configuring the networking attributes of each virtual network adapter includes at least one of enabling a network protocol, disabling a network protocol, assigning a server address, and registering with a Domain Name System (DNS) server.

14. A method for automatically configuring a virtual system, comprising:
determining, by a controller, a connectivity provided by a first physical network interface on a host device to a plurality of virtual local area networks (VLANs);
automatically creating, by the controller, a virtual switch on the host device;
coupling, by the controller, the virtual switch to the first physical network interface;
providing, by the controller, an application on a virtual machine on the host device, wherein the application requires connectivity to at least one of the plurality of VLANs;
creating, by the controller, a virtual port in the virtual switch for each VLAN to which the application requires connectivity;
creating, by the controller, a virtual network adapter in the virtual machine for each virtual port that was created;
coupling, by the controller, each virtual network adapter to a respective virtual port; and
configuring, by the controller, networking attributes of each virtual network adapter based upon the at least one VLAN to which the application requires connectivity.

15. The method of claim 14, further comprising:
determining, by the controller, that a second physical network interface in the host device includes the same connectivity as the first physical network interface to the plurality of VLANs and, in response, teaming the first physical network interface and the second physical network interface and communicatively couple the virtual switch, the first physical network interface and the second physical network interface.

16. The method of claim 14, wherein the configuring the networking attributes of each virtual network adapter includes configuring at least one of an Internet Protocol (IP) address, a Dynamic Host Configuration Protocol (DHCP) hostname, and a Network Interface Controller (NIC) specific route.

17. The method of claim 14, further comprising:
providing, by the controller, the application on the virtual machine in response to selecting the host device based on the connectivity provided by the first physical network interface to the plurality of VLANs.

18. The method of claim 14, further comprising:
providing, by the controller, an agent on the host device, wherein the networking attributes of each virtual network adapter are configured using the agent.

19. The method of claim 14, further comprising:
creating, by the controller, a virtual port group in the virtual switch for at least one of the VLANs to which the application requires connectivity.

20. The method of claim 14, wherein the configuring the networking attributes of each virtual network adapter includes at least one of enabling a network protocol, disabling a network protocol, assigning a server address, and registering with a Domain Name System (DNS) server.

\* \* \* \* \*